(12) United States Patent
Exnar et al.

(10) Patent No.: US 8,003,260 B2
(45) Date of Patent: Aug. 23, 2011

(54) OVERCHARGE AND OVERDISCHARGE PROTECTION IN LITHIUM-ION BATTERIES

(75) Inventors: Ivan Exnar, Itingen (CH); Qing Wang, Ecublens (CH)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/440,628

(22) PCT Filed: Sep. 5, 2007

(86) PCT No.: PCT/IB2007/053578
§ 371 (c)(1), (2), (4) Date: Oct. 23, 2009

(87) PCT Pub. No.: WO2008/032240
PCT Pub. Date: Mar. 20, 2008

(65) Prior Publication Data
US 2010/0081059 A1    Apr. 1, 2010

(30) Foreign Application Priority Data
Sep. 14, 2006 (EP) .................... 06120697

(51) Int. Cl.
*H01M 2/16* (2006.01)
*H01M 4/13* (2010.01)
*H01M 4/58* (2006.01)

(52) U.S. Cl. ............... 429/248; 429/247; 429/231.95; 429/231.9; 429/218.1; 429/209

(58) Field of Classification Search ......... 429/306, 429/307, 248, 247, 231.95, 231.9, 218.1, 429/209
See application file for complete search history.

(56) References Cited

U.S. PATENT DOCUMENTS

| | | | |
|---|---|---|---|
| 4,389,290 A | 6/1983 | Gratzel et al. | |
| 4,547,439 A | 10/1985 | Geniès | |
| 5,084,365 A | 1/1992 | Gratzel et al. | |
| 5,441,827 A | 8/1995 | Gratzel et al. | |
| 5,442,197 A | 8/1995 | Andrieu et al. | |
| 5,482,570 A | 1/1996 | Saurer et al. | |
| 5,569,561 A | 10/1996 | Exnar et al. | |
| 5,858,573 A * | 1/1999 | Abraham et al. | 429/306 |
| 6,024,807 A | 2/2000 | Pappas et al. | |
| 6,067,184 A | 5/2000 | Bonhote et al. | |
| 6,235,182 B1 | 5/2001 | Bele et al. | |
| 6,475,663 B1 * | 11/2002 | Mohwald et al. | 429/129 |

(Continued)

FOREIGN PATENT DOCUMENTS
EP    1244168 A1    9/2002
(Continued)

OTHER PUBLICATIONS
International Search Report for PCT/IB2007/053578, mailed May 8, 2008.
(Continued)

*Primary Examiner* — Helen O Conley
(74) *Attorney, Agent, or Firm* — Dobrusin & Thennisch PC

(57) ABSTRACT

A lithium-ion battery comprising a first electrode made of cathodic material, a second electrode made of anodic material and an electrolyte, said lithium-ion battery containing an overcharge protection material consisting of redox molecules, characterized by the fact that said redox molecules have a reduction potential which is lower than said anodic material.

19 Claims, 2 Drawing Sheets

U.S. PATENT DOCUMENTS

| | | | |
|---|---|---|---|
| 6,870,657 | B1 | 3/2005 | Fitzmaurice et al. |
| 7,749,658 | B2 | 7/2010 | Isono et al. |
| 7,785,740 | B2 | 8/2010 | Amine et al. |
| 2002/0071986 | A1 | 6/2002 | Exnar et al. |
| 2002/0081484 | A1 | 6/2002 | Exnar et al. |
| 2005/0069777 | A1* | 3/2005 | Takami et al. ............... 429/245 |
| 2009/0123837 | A1 | 5/2009 | Gratzel et al. |
| 2009/0130560 | A1 | 5/2009 | Exnar et al. |
| 2009/0176162 | A1 | 7/2009 | Exnar et al. |
| 2009/0186275 | A1 | 7/2009 | Exnar et al. |
| 2010/0178562 | A1 | 7/2010 | Exnar et al. |

FOREIGN PATENT DOCUMENTS

| | | |
|---|---|---|
| JP | 2000294238 A2 | 10/2000 |
| WO | 92/19092 A1 | 10/1992 |
| WO | 2004/001881 A2 | 12/2003 |
| WO | 2008/047324 A3 | 4/2008 |

OTHER PUBLICATIONS

Written Opinion of the International Searching Authority for PCT/IB2007/053578, mailed May 8, 2008.

Richardson, T. J. et al., "Overcharge Protection for Rechargeable Lithium Polymer Electrolyte Batteries", J. Electrochem. Soc., vol. 143, No. 12, (Dec. 1996), pp. 3992-3996 & Abstract, Accession No. 5529863, XP002087822.

Buhrmester, C. et al., "Phenothiazine Molecules—Possible Redox Shuttle Additives for Chemical Overcharge and Overdischarge Protection for Lithium-Ion Batteries", Journal of the Electrochemical Society, vol. 153, No. 2, (Dec. 23, 2005), pp. A288-A294.

Richardson, T.J. et al., "Overcharge Protection for Rechargeable Lithium Polymer Electrolyte Batteries", J. Electrochem. Soc., vol. 143, No. 12, (Dec. 1996), pp. 3992-3996 & Abstract, Accession No. 5529863, XP002087822.

Buhrmester, C. et al., "Phemothiazine Molecules—Possible Redox Shuttle Additives for Chemical Overcharge and Overdischarge Protection for Lithium-Ion Batteries", Journeal of the Electrochemical Society, vol. 153, No. 2, (Dec. 23, 2005), pp. A288-A294.

JACS Articles, "Molecular Wiring of Insulators: Charging and Discharging Electrode Materials for High-Energy Lithium-Ion Batteries by Molecular charge Transport Layers", Published on Web Feb. 28, 2007, 2007 American Chemical Society.

Journal of the Electrochemical Society, 148(3) A224-A229 (2001), The Electrochemical Society, Inc., "Optimized LiFePo4 for Lithium Battery Cathodes".

Buhrmester, C. et al., "The Use of 2,2,6,6—Tetramethylpiperinyl-Oxides and Derivatives for Redox Shuttle Additives in Li-Ion Cells" Journal of the Electrochemical Society, 153 (10) A1800-A1804 (2006).

Buhrmester, C. et al., "Studies of Aromatic Redox Shuttle Additives for LifePo 4-Based Li-Ion Cells" Journal of the Electrochemical Society, 152 (12) A2390-A2399(2005).

Barbé, C. et al., "Nanocrystalline Titanium Oxide Electrodes for Photovoltaic Applications" J Am. Ceram. Soc., 80 (12) 3157-71 (1997).

Cha C.S. et al., "Polypyridine complexes of iron used as redox shuttles for overcharge protection of secondary lithium batteries" Journal of Power Sources 54, 255-258 (1995).

Dahn, J.R. et al., "High-Rate Overcharge Protection of LifePo 4-Based Li-Ion Cells Using the Redox Shuttle Additive 2,5-Ditertbutyl-1, 4-dimethoxybenzene" Journal of the Electrochemical Society, 152 (6) A1283-A1289 (2005).

Dahn, J. et al., "The Drugstore Li-Ion Cell" The Electrochemical Society Interface, Winter 2005.

Chen, G. et al., "Overcharge Protection for Rechargeable Lithium Batteries Using Electroactive Polymers" Electrochemical and Solid State Letters, 7 (2) A-23-A-26 (2004).

Chen, G. et al., "Characterization of an electroactive polymer for overcharge protection in secondary lithium batteries" Electrochimica Acta 50, 4666-4673 (2005).

Exnar, I. et al., "Novel 2 rocking-chair lithium battery based on nano-crystalline titanium dioxide." Journal of Power Sources 68, 720-722 (1997).

Chen, J. et al., "Chemical Overcharge and Chemical Discharge Protection for Lithium Ion Batteries" Electrochemical and Solid State Letters, 8 (1) A-59-A62 (2005).

Schoonman, J., "Nanostructured materials in solid state ionics" Solid State Ionics 135 5-19 (2000).

Tarascon, M. et al., "Issues and Challenges facing rechargeable lithium batteries" Nature vol. 414, Nov. 15, 2001.

Abraham, K.M. et al., "N-Butylferrocene for Overcharge Protection of Secondary Lithium Batteries" J. Electrochem. Soc., vol. 137, No. 6, Jun. 1990.

Kavan, L. et al., Lithium Insertion into Zirconia-Stabilized Mesoscopic $TiO_2$ (Anatase) Journal of the Electrochemical Society 147 (8) 2897-2902 (2000).

Kavan, L. et al., "Lithium Storage in Nanostructured $TiO_2$ Made by Hydrothermal Growth" Chem. Mater. 16, 477-485, 2004.

Xiao, L.F., "A Composite Polymer Membrane with reversible overcharge protection mechanism for lithium ion batteries" Electrochemistry Communications 7, 589-592 (2005).

Adachi, M. et al., "Aromatic Compounds as Redox Shuttle Additives for 4 V Class Secondary Lithium Batteries" Journal of the Electrochemical Society 146 (4), 1256-1261 (1999).

Wagemaker, M., "Equilibrium lithium transport between nanocrystalline phases in intercalated $TiO_2$ anatase" Nature vol. 418-397, 2002.

Nishijima, M. et al., "Li Deintercalation-Intercalation Reaction and Structural Change in Lithium Transition Metal Nitride, $Li_7MnN_{54}$" J. Electrochem. Soc., vol. 141 No. 11, 1994.

Golovin, M.N. et al., "Applications in Metallocenes in Rechargeable Lithium Batteries for Overcharge Protection" J. Electrochem. Soc., vol. 139 No. 1, 1992.

Poizot, P. et al., "Nano-sized transition metal oxides as negative-electrode materials for Lithium-ion batteries" Nature vol. 407 (2000).

Wang, R.L., "Calculations of oxidation Potentials of Redox Shuttle Additives for Li-Ion Cells" Journal of the Electrochemical Society, 153 (2) A445-A449 (2006).

Han, S.C., "Reversible Formation and Decomposition of LiF Clusters Using Transition Metal Fluorides as Precursors and Their Application in Rechargeable Li Batteries" 351 273 (2003).

Narayanan, S.R., "Analysis of Redox Additive-Based Overcharge Protection for Rechargeable Lithium Batteries" J. Electrochem. Soc., vol. 138 No. 8, 1991.

Huang, S.Y., "Rocking Chair Lithium Battery Based on Nanocrystalline $TiO_2$ (Anatase)" J. Electrochem. Soc., vol. 142 No. 9, 1995.

Tran-Va F. et al., "Dihydrophenazine derivatives for Overcharge Protection of Rechargeable Lithium Batteries" Electrochimica Acta 44 2789-2792 (1999).

Pralong, V., "Reversible Lithium uptake by $CoP_3$ at low potential: role of the anion" Electrochemistry Communications 4, 516-520 (2002).

Watanabe, Y. et al., "Electrochemical properties of aryladamantanes as new overcharge protection compounds for lithium cells" Journal of Power Sources 154, 246-254 (2006).

Guo, Yu-Guo et al., "Synthesis of hierarchically mesoporous anatase spheres and their application in lithium batteries" Chem Comm 2783-2785 (2006).

Department of Chemistry and Biochemistry, "The Fermi Level and the Redox Potential", J. Phys. Chem. 89, 3789-3791, (1985).

* cited by examiner

FIG. 1A
FIG. 1B
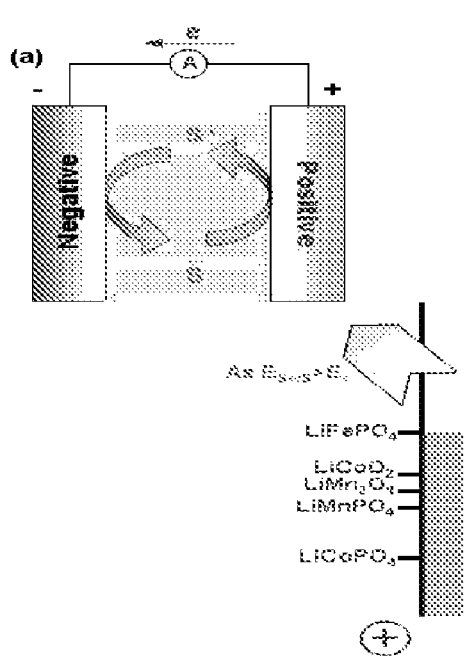
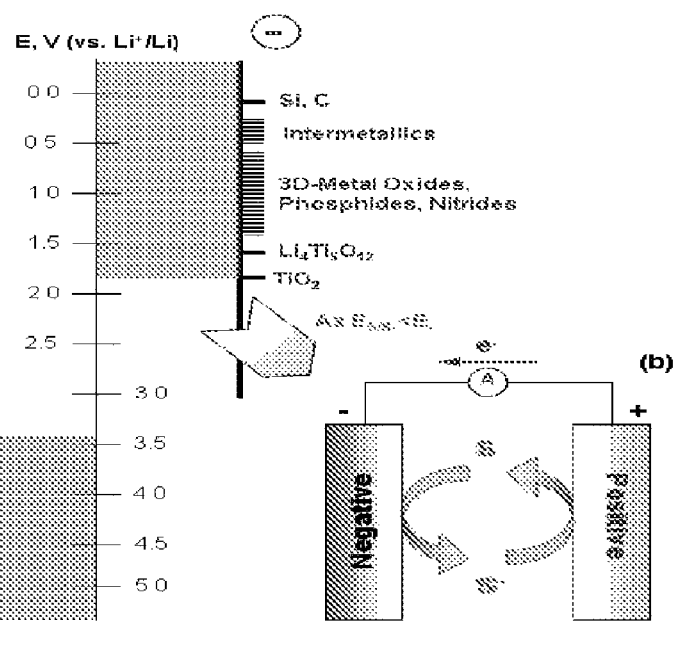

OVERCHARGE AND OVERDISCHARGE PROTECTION IN LITHIUM-ION BATTERIES

This application is the U.S. national phase of International Application No. PCT/IB2007/053578, filed 5 Sep. 2007, which designated the U.S. and claims priority to Europe Application No. 06120697.5, filed 14 Sep. 2006, the entire contents of each of which are hereby incorporated by reference.

FIELD OF INVENTION

The present invention relates to lithium-ion batteries including an overcharge/discharge protection. It more precisely relates to an overcharge/discharge protection consisting of redox molecules.

STATE OF THE ART

Lithium-ion are known since more than 15 years. Today they are used in different fields, in particular as power sources for portable consumer electronics.[1] When using lithium intercalation compounds as electrode material, lithium ion batteries show excellent performances of high energy density, long cycle life, and slow self-discharge rate, etc.

Despite its success, the safety of single cell and its pack under aggressive conditions is still one big issue for using as "drugstore" or consumer-assembled batteries, where the hazard caused by overcharge or overdischarge is one of the critical reasons.[2] One approach for overcharge protection is using redox shuttle additives in the electrolyte[3] or embedded in a separator[4]. When the cell is overcharged, the redox shuttles start to be either oxidized at the positive electrode or reduced at the negative electrode when a characteristic cell potential is obtained. The mobile reaction products diffuse through the electrolyte to the opposite side of the cell where a second electron-transfer reaction returns it to its original state. The net effect is an internal shunt which prevents deterioration of the cell by imposing a limit on cell potential.

There have been many studies focusing on redox shuttles with potentials higher than those of the cathodic material (we call it "p-type shuttle" here).[3,4] As indicated in FIG. 1(a), upon overcharge with a fully delithiated cathodic material, the redox molecules (S) are oxidized at the positive electrode, and then the oxidized species (S$^+$) diffuse to the negative electrode, where they are reduced to the original state. Consequently, the upper potential of the cell is kept by the redox molecules, and the possible damage to the electrolyte and electrode material is prohibited. Numerous p-type redox molecules have been tested so far, such as metallocenes[3a-3c], metal complexes[3d], aromatic molecules[3e-3j,3m,3n], phenothiazine derivatives[3k,3l], 2,2,6,6-tetramethyl-1-piperidinyloxy (TEMPO)-like molecules[3l,3o], conducting polymer[4], perfluoroborane cluster salts[5] etc., where only 2, 5-di-tert-butyl-1,4-dimethoxybenzene shows promise in LiFePO$_4$ based lithium ion batteries during long term cycling.[2,3h] While for 4 V class cathodic material, no practically acceptable shuttle molecule has been proposed so far because of the difficulties in achieving high potential and stability.

GENERAL DESCRIPTION OF THE INVENTION

The present invention offers an alternative to existing overcharge/discharge protection systems. It is based on the surprising effect that the use of redox molecules having reduction potential which is below than the reduction potential of the anode offers an efficient level of safety, against either overcharge or discharge.

More precisely the invention relates to a lithium-ion battery comprising a first electrode made of cathodic material, a second electrode made of anodic material and an electrolyte, said lithium-ion battery containing an overcharge/discharge protection material consisting of redox molecules, characterized by the fact that said redox molecules have a reduction potential which is lower than said anodic material.

Preferred embodiments of the invention are defined in the dependent claims.

Compared to the conventional state-of-the-art p-type shuttles, the shuttles according to the invention, called n-type shuttles in the present text, provide several advantages, in particular: As the oxidation potential of the shuttle molecules is high enough, any cathodic material can be used in the battery. In addition. The use of n-type shuttle molecules also opens new opportunity for having molecules with much better stability.

DETAILED DESCRIPTION OF THE INVENTION

The invention is discussed below in a more detailed way with examples illustrated by the following figures:

FIG. 1A represents a state-of-the-art schematic model showing the working principle of molecular shuttles for lithium ion batteries upon overcharge protection wherein p-type shuttle molecules are oxidized at positive electrode as $E_{S+/S} > E_+$, and reduced at negative electrode.

FIG. 1B represent a model according to the invention wherein n-type shuttle molecules are reduced at negative electrode as $E_{S/S-} < E_-$, and oxidized at positive electrode.

Figure 3A:
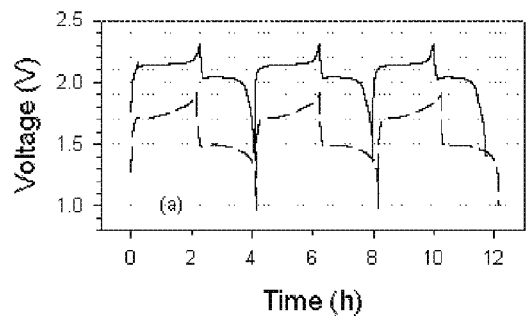

FIG. 3A shows galvanostatic voltage profiles of TiO$_2$/LiCoO$_2$ (full line) and TiO$_2$/LiFePO$_4$ (dashed line) full cells during charge/discharge in the absence of 0.4 M benzophenone in the electrolyte. The electrolyte is 0.66 M LiClO$_4$/PC+DME (2:1). The current density is 0.05 mA/cm$^2$.

Figure 3B:
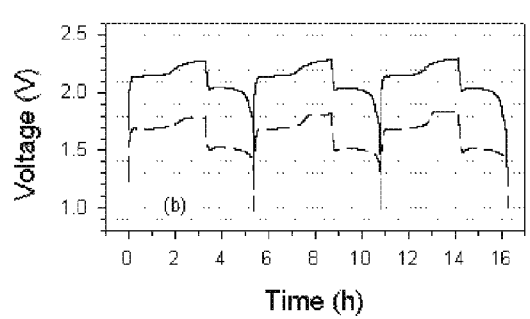

FIG. 3B shows galvanostatic voltage profiles of TiO$_2$/LiCoO$_2$ (full line) and TiO$_2$/LiFePO$_4$ (dashed line) full cells during charge/discharge in the presence of 0.4 M benzophenone in the electrolyte. The electrolyte is 0.66 M LiClO$_4$/PC+DME (2:1). The current density is 0.05 mA/cm$^2$.

As indicated in FIG. 1(b), upon overcharge with a fully lithiated anodic material, its potential further decreases and the redox molecules (S) start to reduce at the negative electrode. Then the reduced species (S−) diffuse to the positive electrode, where S is regenerated. In this strategy, except that the onset reduction potential of the redox shuttle molecule must be slightly lower than that of the anodic material to prevent self-discharge during storage and to allow for some overpotential during charging, requirements for such additives are similar to their p-type counterparts: firstly the redox shuttle molecule must be unreactive toward all cell components in both its oxidized and reduced forms; secondly it must be present in sufficient concentration and have a high enough diffusion coefficient to give a shuttle current at least as great as that at which the cell is charged; and very importantly the molecule must be stable enough or highly reversible to sustain long term cycling. En embodiment of the invention is discussed below wherein benzophenone (BP) is used as n-type shuttle in TiO$_2$/LiFePO$_4$ and TiO$_2$/LiCoO$_2$ cells.

The structure of a benzophenone (BP) molecule is represented as follows:

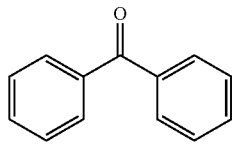

The mesoscopic anatase TiO$_2$ films (particle size ~20 nm) were prepared on F-doped conducting glass (FTO) by reported method.[6] LiCoO$_2$ (Degussa) and LiFePO$_4$ (ZSW) films were prepared by mixing the powders with 5 wt. % PVDF, 10~15 wt. % acetylene black, and stirring with N-methyl-2-pyrrolidone (NMP). The resulting homogeneous slurry was then doctor-bladed onto FTO. The electrolyte was 0.66 M LiClO$_4$/PC+DME (2:1, w/w). Benzophenone (BP) was purchased from Fluka (>99.0%), and was dissolved in above electrolyte. Voltammetric and galvanostatic measurements employed a PC-controlled AutoLab® PSTA30 electrochemical workstation (Eco Chimie).

Figure 2:
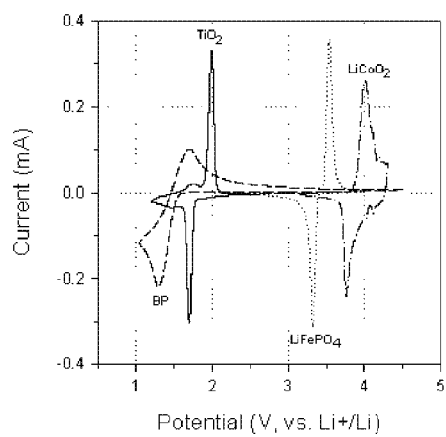
FIG. 2 shows cyclic voltammograms of various electrode materials: TiO$_2$ (full line), LiFePO$_4$ (point line), and LiCoO$_2$ (dashed line) obtained in the electrolyte of 0.66 M LiClO$_4$/PC+DME (2:1), the scan rate being 0.1 mV/s. The dashed curve was obtained with a Pt disk electrode in the presence of 10 mM benzophenone in the electrolyte, the scan rate being 0.1 V/s.

Mesoscopic anatase TiO$_2$ has been extensively studied as anodic material for lithium ion batteries in many literatures.[7] Li$^+$ is inserted into the lattice of anatase TiO$_2$ at ~1.75 V (vs. Li$^+$/Li) during charging. As the cyclic voltammograms shown in FIG. 2, the onset reduction potential of BP is ~1.60 V, which is lower than that of TiO$_2$. It is expected that as the fully lithiated TiO$_2$ electrode is overcharged, it will surpass the lithium insertion potential of TiO$_2$ and reaches the redox potential of BP. As a consequence, BP will be reduced at the anodic current collector and the reduced species BP$^-$ will diffuse to the positive electrode. The cathodic material and electrolyte are thus stabilized, since the total flux of current flow is carried by the shuttle molecule. By using voltammetric method, the diffusion coefficient of BP in 0.66 M LiClO$_4$/PC+DME (2:1) electrolyte is estimated to be ~1.1×10$^{-6}$ cm$^2$/s,[8] which is in the same order to the other shuttle molecules[3j,3k].

In addition, because of the efficient charge delocalization of the molecule (see the BP structure above), the oxidation potential of BP is very high, being far beyond the measured potential range, 4.50 V (vs. Li$^+$/Li). In other words, it renders the validity of cathodic material with potential lower than this value when using BP as redox shuttle molecule. As the cyclic voltammograms shown in FIG. 2, the charging potentials of the typical cathodic material LiFePO$_4$ and LiCoO$_2$ are perfectly located in this potential window, being 3.45 and 3.90 V, respectively.

FIG. 3A shows the galvanostatic voltage profiles of TiO$_2$/LiFePO$_4$ and TiO$_2$/LiCoO$_2$ full cells during continuous charge/discharge cycling, the cutoff voltage being 1.90 and 2.30 V, respectively. Consistent with the potentials of the electrode material, the voltage plateaus during charging process are around 1.70 and 2.15 V for TiO$_2$/LiFePO$_4$ and TiO$_2$/LiCoO$_2$ cells, respectively. When the cells reach full charge, the terminal voltage increases steeply. FIG. 3B shows the voltage profiles of the cells in the presence of 0.4 M BP in the electrolyte as redox shuttle. As the cells are overcharged, the voltage increases rapidly at first. When the negative electrodes reach the shuttle potential, the cell voltage is clamped while the constant current continues to flow. The second voltage plateaus of the charging process, being around 1.80 and 2.26 V for TiO$_2$/LiFePO$_4$ and TiO$_2$/LiCoO$_2$ cells, respectively, just indicate the effective operation of BP. It also proves that the utilization of BP is independent of the cathodic material, as it is stable enough for oxidation. In addition, it is clear that the presence of BP in the electrolyte almost has no influence on the cell voltage and capacity, indicating the validity of the shuttle molecule during overcharge protection. However, because BP is not electrochemically reversible, here we are not trying to test its stability during long time turnover cycling.

Similar to the p-type approach, the n-type shuttle can also be used for overdischarge protection. For a lithium ion battery, when the cell reaches end of discharge, the terminal voltage decreases rapidly as a consequence of steep dropping of the positive electrode potential. As the potential of the fully lithiated positive electrode reaches that of the n-type shuttle molecule, the molecule will start to reduce, then the electrode potential is clamped there just as the case of overcharge.

Several types of anodic material can be used in the present invention, in particular, anodic material with high lithium insertion potentials, such as intermetallic alloys, 3D-nanostructured metal oxides (nitrides, sulfides, phosphides, fluorides)[9], TiO$_2$, and Li$_4$Ti$_5$O$_{12}$.

In summary, a novel overcharge protection strategy of using n-type redox shuttle molecules has been successfully demonstrated. By using TiO$_2$ as anodic material, LiFePO$_4$ and LiCoO$_2$ as cathodic material, the benzophenone molecule has shown quite nice shuttle functions during overcharge of the cells. The invention constitutes therefore a very promising alternative strategy for achieving overcharge (overdischarge) protection in lithium ion batteries.

NOTES AND REFERENCES

1. J. M. Tarascon and M. Armand, *Nature*, 2001, 414, 359.
2. J. R. Dahn, J. W. Jiang, L. Moshurchak, C. Buhrmester, and R. C. L. Wang, *Interface*, 2005, 15, 27.
3. (a) K. M. Abraham, D. M. Pasquariello, and E. B. Willstaedt, *J. Electrochem. Soc.*, 1990, 137, 1856. (b) S. R. Narayanan, S. Surampudi, A. I. Attia, and C. P. Bankston, *J. Electrochem. Soc.*, 1991, 138, 2224. (c) M. N. Golovin, D. P. Wilkinson, J. T. Dudley, D. Holonko, and S. Woo, *J. Electrochem. Soc.*, 1992, 139, 5. (d) C. S. Cha, X. P. Ai, and H. X. Yang, *J. Power Sources*, 1995, 54, 255 (e) T. J. Richardson and P. N. Ross, *J. Electrochem. Soc.*, 1996, 143, 3992. (f) M. Adachi, K. Tanaka, and K. Sekai, *J. Electrochem. Soc.*, 1999, 146, 1256. (g) F. Tran-Van, M. Provencher, Y. Choquette, and D. Delabouglise, *Electrochimica Acta*, 1999, 44, 2789. (h) J. R. Dahn, J. W. Jiang, L. M. Moshurchak, M. D. Fleischauer, C. Buhrmester, and L. J. Krause, *J. Electrochem. Soc.*, 2005, 152, A1283. (i) C. Buhrmester, J. Chen, L. Moshurchak, J. W. Jiang, R. L. Wang, and J. R. Dahn, *J. Electrochem. Soc.*, 2005, 152, A2390. (j) J. Chen, C. Buhrmester, and J. R. Dahn, *Electrochem. Solid State Lett.*, 2005, 8, A59. (k) C. Buhrmester, L. Moshurchak, R. L. Wang, and J. R. Dahn, *J. Electrochem. Soc.*, 2006, 153, A288. (l) R. L. Wang, C. Buhrmester, and J. R. Dahn, *J. Electrochem. Soc.*, 2006, 153, A445. (m) Y. Watanabe, H. Morimoto, and S. Tobishima, *J. Power Sources*, 2006, 154, 246. (n) H. Lee, J. H. Lee, S. Ahn, H. J. Kim, and J. J. Cho, *Electrochem. Solid State Lett.*, 2006, 9, A307. (o) C. Buhrmester, L. M. Moshurchak, R. C. L. Wang, and J. R. Dahn, *J. Electrochem. Soc.*, 2006, 153, A1800.
4. (a) G. Y. Chen and T. J. Richardson, *Electrochem. Solid State Lett.*, 2004, 7, A23. (b) L. F. Xiao, X. P. Ai, Y. L. Cao, Y. D. Wang, and H. X. Yang, *Electrochem. Comm.*, 2005, 7, 589. (c) G. Y. Chen, K. E. Thomas-Alyea, J. Newman, and T. J. Richardson, *Electrochimica Acta,* 2005, 50, 4666. (d) G. Y. Chen and T. J. Richardson, *Electrochem. Solid State Lett.,* 2006, 9, A24.

5. G. Dantsin, K. Jambunathan, S. V. Ivanov, W. J. Casteel, K. Amine, J. Liu, A. N. Jansen, and Z. Chen, in *Proceedings of International Meeting on Lithium Batteries,* Abstract No. 393, Biarritz, France, Jun. 18-23, 2006.

6. C. J. Barbe, F. Arendse, P. Comte, M. Jirousek, F. Lenzmann, V. Shklover, and M. Grätzel, *J. Am. Ceram. Soc.,* 1997, 80, 3157.

7. (a) S. Y. Huang, L. Kavan, I. Exnar, and M. Grätzel, *J. Electrochem. Soc.,* 1995, 142, L142. (b) I. Exnar, L. Kavan, S. Y. Huang, and M. Grätzel, *J. Power Sources,* 1997, 68, 720. (c) L. Kavan, A. Attia, F. Lenzmann, S. H. Elder, and M. Grätzel, *J. Electrochem. Soc.,* 2000, 147, 2897. (d) J. Schoonman, *Solid State Ionics,* 2000, 135, 5. (e) M. Wagemaker, A. P. M. Kentgens, and F. M. Mulder, *Nature,* 2002, 418, 397. (f) L. Kavan, M. Kalbac, M. Zukalova, I. Exnar, V. Lorenzen, R. Nesper, and M. Grätzel, *Chem. Mater.,* 2004, 16, 477. (g) Y. G. Guo, Y. S. Hu, and J. Maier, *Chem. Comm.,* 2006, 2783.

8. The reduction of BP is not electrochemically reversible. The diffusion coefficient of BP in the electrolyte was just estimated from the reduction peak current in comparision with the standard solution of ferrocene in acetonitrile using 0.1 M tetra-n-butylammonium perchlorate as supporting electrolyte.

9. (a) M. Nishijima, N. Tadokoro, Y. Takeda, N. Imanishi, and O. Yamamoto, *J. Electrochem. Soc.,* 1994, 141, 2966. (b) P. Poizot, S. Laruelle, S. Grugeon, L. Dupont, and J. M. Tarascon, *Nature,* 2000, 407, 496. (c) V. Pralong, D. C. S. Souza, K. T. Leung, and L. F. Nazar, *Electrochem. Comm.,* 2002, 4, 516. (d) S. C. Han, H. S. Kim, M. S. Song, J. H. Kim, H. J. Ahn, and J. Y. Lee, *J. Alloys Compd.,* 2003, 351, 273. (e) H. Li, G. Richter, and J. Maier, *Adv. Mater.,* 2003, 15, 736.

The invention claimed is:

1. A lithium-ion battery comprising:
   a) a first electrode made of a cathodic material,
   b) a second electrode made of an anodic material, and
   c) an electrolyte, said lithium-ion battery including redox molecules in an amount and concentration so that the lithium-ion battery is protected from overcharging or overdischarging,
   wherein the redox molecules have a reduction potential which is lower than said anodic material; and
   wherein said redox molecules are benzophenone molecules.

2. A lithium-ion battery according to claim 1 wherein said anodic material is $TiO_2$.

3. A lithium-ion battery according to claim 1 wherein said anodic material is selected from the group of intermetallic alloys, 3D-nanostructured metal oxides and $Li_4Ti_5O_{12}$.

4. A lithium-ion battery according to claim 2 wherein said cathodic material is $LiFePO_4$.

5. A lithium-ion battery according to claim 2 wherein said cathodic material is $LiCoO_2$.

6. A lithium-ion battery according to claim 1 wherein said redox molecules are in the form of an additive in the electrolyte.

7. A lithium-ion battery according to claim 1 wherein said redox molecules are embedded in a separator.

8. A lithium-ion battery according to claim 1, wherein the benzophenone molecules in the electrolyte has a diffusion coefficient of about $1.1 \times 10^{-6}$ $cm^2/s$.

9. A lithium-ion battery according to claim 1, wherein the redox molecules are present in the electrolyte at a concentration of 0.4 M.

10. A lithium-ion battery according to claim 1, wherein the redox molecules are present in the electrolyte at a concentration of 10 mM.

11. A battery comprising:
    a) a first electrode including one or both of $TiO_2$ or $Li_4Ti_5O_{12}$;
    b) a second electrode including $LiFePO_4$; and
    c) an electrolyte including $LiClO_4$, Propylene Carbonate, and Dimethoxyethane;
    wherein benzophenone is dissolved in the electrolyte, and the benzophenone has a reduction potential that is lower than the first electrode.

12. The battery of claim 11, further including the benzophenone in an amount and concentration so that the lithium-ion battery is protected from overcharging or overdischarging, and a diffusion coefficient in an amount so that a shuttle current of the benzophenone is at least as great as a current which is charging the battery;
    wherein the benzophenone is unreactive toward components of the battery in both its oxidized and reduced forms; and
    wherein the benzophenone is stable so that the benzophenone sustains long term cycling.

13. The battery of claim 11, wherein the benzophenone is present in the electrolyte at a concentration of 0.4 M.

14. The battery of claim 11, wherein the diffusion coefficient of the benzophenone in the $LiClO_4$, Propylene Carbonate, and Dimethoxyethane, is about $1.1 \times 10^{-6}$.

15. The battery of claim 11, wherein the second electrode further includes acetylene black, Polyvinylidene fluoride, and N-methyl-2-pyrrolidone.

16. The battery of claim 11, wherein the ratio of Propylene Carbonate to Dimethoxyethane is 2:1.

17. The battery of claim 13, wherein the ratio of Propylene Carbonate to Dimethoxyethane is 2:1.

18. The battery of claim 11, wherein the cutoff voltage during continuous charge/discharge cycling of the battery with the $LiFePO_4$ electrode is 1.90V.

19. The battery of claim 16, wherein the benzophenone is present in the electrolyte at a concentration of 10 mM.

* * * * *